INVENTORS
Michel VEAUX
François MARCHAL

ATTORNEYS

INVENTORS
Michel VEAUX
Francois MARCHAL

3,348,396
MAGNETIC FORMING APPARATUS, DEVICE AND METHOD FOR MAKING DEEP GROOVES ON PARTS MADE OF CONDUCTING MATERIALS, PARTICULARLY TUBES MADE OF METAL OR CERAMIC-METAL MATERIALS
Michel Veaux, Cardana, and François Marchal, Cadrezzate, Italy, assignors to European Atomic Energy Community-Euratom, Brussels, Belgium
Filed Mar. 9, 1965, Ser. No. 438,291
Claims priority, application, Belgium, Mar. 26, 1964, 518,374
9 Claims. (Cl. 72—56)

ABSTRACT OF THE DISCLOSURE

For producing deep grooves on thin parts, preferably cylindrical, there is first produced a groove of limited depth by concentration of a magnetic pressure on the zone facing a shoulder from which the magnetic field originates. Thereafter, a thin annular member made of a highly conducting metal is mounted between the shoulder and the groove of limited depth at a small distance from the groove. The thin annular member is supported by means of an elastic material having a hardness consistent with the properties of the material to be deformed and a shape corresponding to the shape of the groove to be obtained. Magnetic pressure is applied on the groove of limited depth and there is a deforming operation by compression of the elastic material to deepen the groove. Similar successive operations may be carried out using elastic elements having greater cross-sections.

Figure 1:
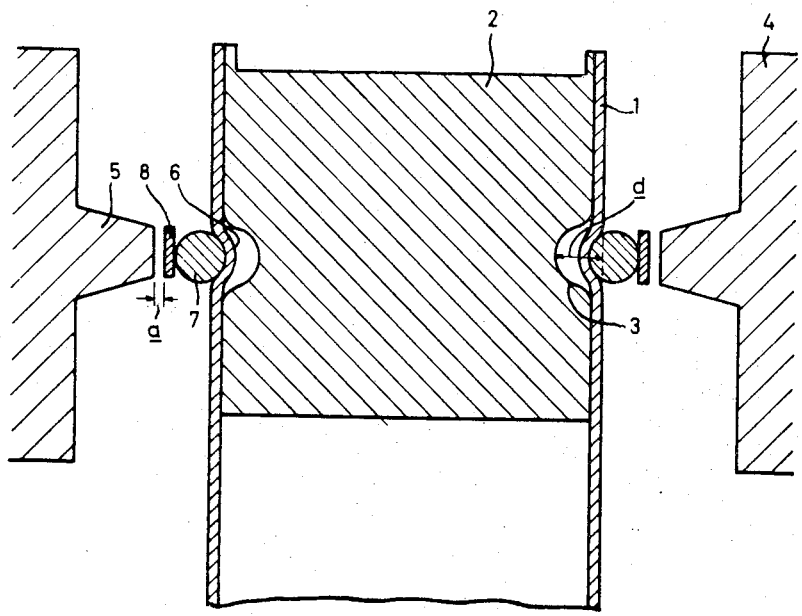

The apparatus therefor comprises a coil to create a magnetic field, a shoulder for concentrating the magnetic field, a conductive intermediate member on which repulsive forces are induced and a series of elastic elements having the shape of the groove to be formed.

---

The instant invention relates to a method and a device for producing deep grooves on thin parts made of conducting material, of a flat form or of a form having a cylindrical symmetry, by means of a magnetic pulse forming apparatus, essentially comprising a coil creating a pulsating magnetic field and a metallic body of very weak resistivity having at least one shoulder to concentrate the magnetic pressure on the zone of the part to be deformed, in correspondence with the groove of a die or of a body to which the part is to be joined.

The method according to the invention applies to most of the standard metals and alloys and also ceramic-metal composite materials such as, for instance, the metal-oxide composite aluminum-alumina, which is known as S.A.P. (Sintered Aluminum Powder).

The invention is particularly applicable to the manufacture of fuel rod sheaths for nuclear reactors, for instance to mechanically join together the sheath and end closing plugs therefor or, at one or both ends of the sheath, a corrugated portion or bellows to constitute an expansion joint.

As is known, the magnetic deformation method which applies to the deformation of thin conducting parts, essentially resides in creating on the part to be deformed a compression force obtained by concentration of a magnetic pressure caused by pulsations of short duration, of from 10 to 20 micro-seconds for instance, originating from a very high intensity magnetic field.

The apparatus for carrying out this method is called "Magneform Mark I," described in an article entitled "Magnetic-Pulse Forming" read before the Automotive Engineering Congress at Detroit, Mich. on January 1962 and essentially comprising a coil within which takes place the rapid discharge of condensers through an ignitron and a rigid metallic body or insert of very small specific resistance which is normally provided with one or several shoulders to concentrate the magnetic field on one or several zones of the part to be deformed. Induced currents of directions reverse those of the coil flow on the surface of said shoulders, at each pulse which consequently create on the part repulsive forces forming the compression force.

When applying this method of deformation to the production of grooves, the man of the art is faced with different problems related to the limited capacity of the apparatus and to the elastic and electric characteristics of the various materials constituting the parts to be provided with grooves.

Generally, the most important drawback inherent to this method resides in the difficulty of obtaining a groove of maximum depth in relation either to the width of the groove itself or to the shape and dimensions of the part, because of the clearance that forms between the end of the shoulder which concentrates the magnetic field on the zone to be deformed and the depth of the formed groove near the end of the deformation operation.

In fact, the magnetic field produced by the coil varying as the reciprocal of the square of the distance, the material of the part located at the bottom of the groove becomes subjected to a much weaker magnetic field and consequently the compression force applied thereagainst is too weak to produce complete formation of the groove, at the desired depth.

This drawback is the more serious the higher the specific resistance of the material or the lower the plastic characteristics thereof, such that with material having little elasticity, it is impossible to obtain deep grooves.

To overcome such drawback, where more powerful apparatuses are not available, recourse has been had in the formation of grooves on tubes to the use of "inserts" made up of two parts to allow a shoulder of predetermined small width to be gradually moved inside the groove near the end of the operation to thus allow the material to be maintained in a magnetic field of sufficient intensity to lengthen the deformation.

This method has however the disadvantage that it is costly since several inserts must be provided in view of the different widths of grooves that may be desired and, furthermore, it application is limited because it is impossible to reduce the width of the shoulder beyond a certain dimension if bending or collapsing thereof is to be avoided.

Besides, by operating in two successive steps with two inserts having shoulders of different shapes, it is often necessary, if the material of the part is a metal, to anneal the said metal.

Another disadvantage met in the application of this method of forming grooves on tubes made of ceramic-metal materials, S.A.P. for instance, is that the cross-section of this material does not reduce uniformly; the final groove has a fold in front of the axial slot provided, in the inserts used, to confine the induced currents on the outer surface of the latter. In order to avoid this fold, it is necessary to carry out successive operations at increasing power, rotating the part each time a fraction of a turn.

An object of the present invention lies in a method for the forming of a groove by means of a magnetic deforming machine of the above type, the novel method making it possible to obtain deep grooves even in materials having little elasticity and to obtain a uniform distribution of the compression force on the part to be deformed; the new method thus eliminating the drawbacks of the present method and having manufacturing features that make the method applicable on an industrial scale.

The main object of the invention is the perfecting of a method essentially consisting in creating a compression force on a metallic body retained at a predetermined fixed distance from the insert and to create on the part a deforming pressure transmitted by a member made of elastic material such as rubber disposed between the said metallic body and the part itself.

The method according to the invention is characterized by the fact that a groove of limited depth is produced preferably first by means of at least one deforming operation of the part by concentration of the magnetic pressure on the zone facing the shoulder; a thin annular member made of a highly conducting metal, preferably aluminium, and having a width preferably at least equal to that of the shoulder, is mounted at a small distance from the shoulder; the annular member being supported by an element made of elastic material such as rubber and having a hardness consistent with the properties of the material of the part to be deformed and having a shape corresponding to the shape of the groove to be obtained; the elastic element is mounted in direct contact with the part to be deformed or enters into the groove which has been obtained; and that at least one deforming operation is carried out on the part to be deformed by compression of the elastic element stressed in compression by the annular member over which the magnetic pressure is concentrated.

According to another feature of the invention, the method is carried out in successive deforming operations or series of deforming operations and a new elastic element, having a greater cross-section is substituted, for each operation or series of operations, between the annular member and the deformed zone of the part whereby to maintain the annular member at substantially the same distance from the shoulder. According to another feature of the method, the annular member is substituted for another wider annular member between two successive operations or series of operations.

The device, according to the invention, for carrying out the above-described method comprises a series of annular members made of highly conductive metal having a thickness smaller than 1 mm. and a different width comprised between the width of the shoulder and the width of the groove to be obtained, and a plurality of elastic elements of increasing cross-section.

Yet another object of the invention is to provide a dismountable die for use in carrying out the above-mentioned method in the production of a series of corrugations on a tube, the said die essentially comprising a stack of elastic rings having a diameter corresponding to the depth of the desired grooves or corrugations and in a number greater, by one, than the number of grooves, and metallic spacing rings inserted in between. The assembly is mounted on a cylindrical core between two sleeves centering the core in the tube, the said centering sleeves being arranged between two lock members provided at the ends of the core; one of the lock members, adjustable in position, is removable.

Figure 2:
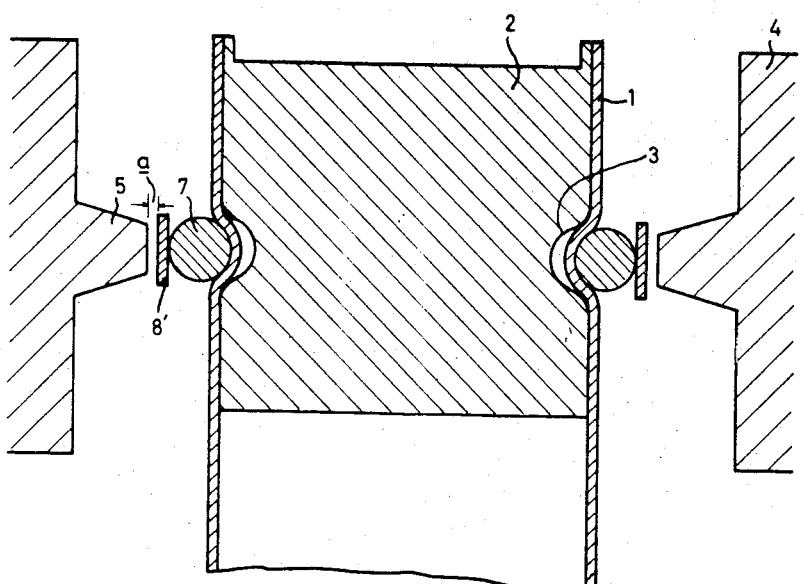
Figure 1:
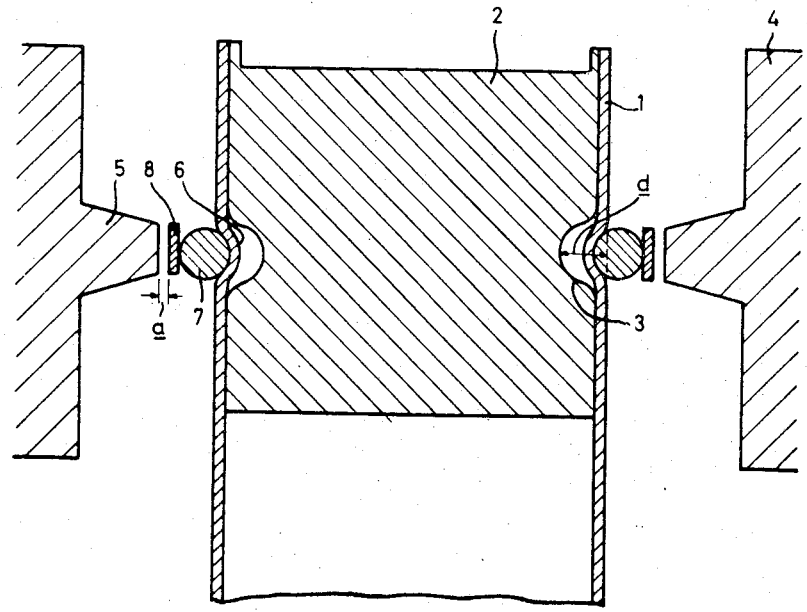
Figure 2:
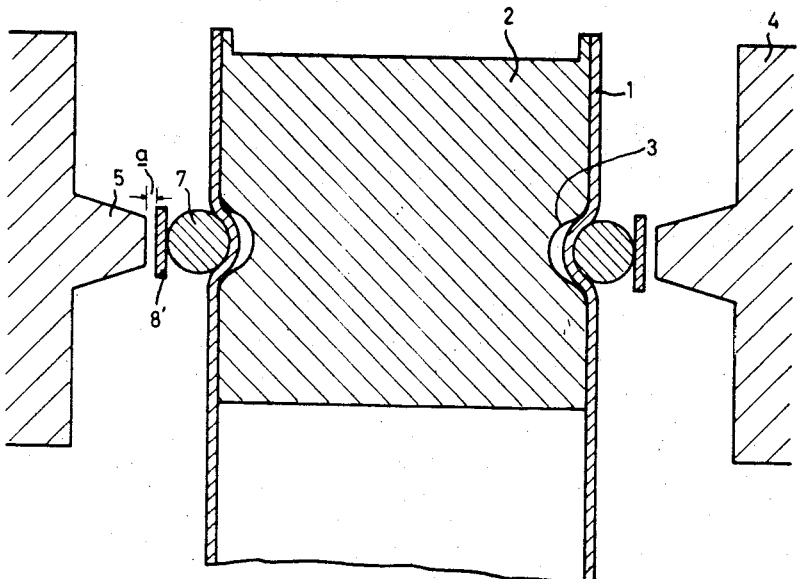

Other details and features of the invention will become apparent from the following description given as a non-limitative example and with reference to the appended drawings wherein:

FIGS. 1 and 2 are two schematic longitudinal cross-sectional views of a tube and a device for the formation of grooves on said tube in two successive forming operations according to the method of the invention, and FIG. 3 is a dismountable die usable in carrying out the method according to the invention for the formation of a series of corrugations on a tube.

Referring now to FIGS. 1 and 2, there is shown a cylindrical tube 1 made of sintered aluminium containing high percentages of alumina, the tube to constitute the sheath of a nuclear fuel element (not shown) and to be closed by a plug 2 intended to be mechanically joined to the tube by forcing the latter into an annular groove 3 by means of a magnetic pulse forming apparatus represented by an insert 4 having a shoulder 5 capable of concentrating, in the space comprised between the said shoulder and the area of the tube 1 overlying groove 3, the magnetic field being created by a coil (not shown) mounted concentric with the insert 4.

According to the invention, a deformation of the said tube zone is first obtained by magnetic pressure to define a groove 6 which, tube 1 being made of sintered aluminium which is not very plastic, is much shallower than the depth $d$ of groove 3 of the plug. Thereafter, an annular member 8 of a highly conductive metal such as aluminium and having a width equal to that of shoulder 5 and a thickness sufficient to allow its elastic deformation is mounted around the tube 1 at a distance $a$ of shoulder 5 while a rubber ring 7 is mounted in groove 6 between annular member 8 and tube 1.

The distance $a$, in the order of 0.5 mm., is determined from the capacity of the magnetic forming apparatus in such a manner that the annular member 8 be stressed, during the magnetic impulse, by a strong compression force which is transmitted to the bottom of groove 6 by compression of ring 7.

According to the inventive method, the complete application on the contour of groove 3 which requires a deep deformation of the material having little plasticity constituted by tube 1, is obtained by successive deepening of the groove by means of single or repeated deformations made by using, for the successive depths reached, a rubber ring of an increasingly greater diameter between groove 6 and annular member 8.

The diameter of each successive elastic element 7 is so chosen that annular member 8 always has the same distance $a$ to shoulder 5 as will be gathered from a study of FIGS. 1 and 2 referring to two different stages of the forming method.

As seen in FIG. 2, successive deforming operations may be carried out by substituting annular member 8 for another member 8' having a greater width. The use of annular members of increasing width, with a maximum value equal to the width of groove 3, makes it possible to obtain a better distribution of the pressure over all of the outline of the groove.

The operating conditions of the method as well as the order of the size of grooves obtained are illustrated in the examples given hereinafter of a mechanical connection of the above-mentioned type:

*First example*

Sheath:
    Material _____ Stainless steel AISI 304 (specific resistance 75 micro-ohm cm.).
    External diameter _____ 26.3 mm.
    Internal diameter _____ 25.5 mm.
    Thickness _____ 0.4 mm.
Plug:
    Material _____ Stainless steel AISI 304.
    External diameter _____ 25.5 mm.
    Width of groove _____ 9 mm.
    Groove bead _____ $r=2$ mm.
    Groove diameter _____ 5 mm.
Apparatus:
    Model _____ Magneform Mark 1
    Maximum capacity _____ 6 kj.
    Inner bore of insert _____ 40.7 mm.
    Width of end of shoulder ____ 5 mm.

| Operations No. | Capacity percent of maximum capacity | Depth of groove, mm. | Annular member, Aluminum (distance a=0.4 mm.) ||| Elastic ring |
| --- | --- | --- | --- | --- | --- | --- |
|  |  |  | Width, mm. | External diameter, mm. | Thickness, mm. | Rubber hardness Shore 60 diameter, mm. |
| 1 | 80 | 2.5 | 8 | 39.9 | 0.8 | 6 |

*Second example*

Sheath:
   Material            S.A.P. 7% alumina (specific resistance 3.5 micro-ohm cm.).
   External diameter    30 mm.
   Internal diameter    28.4 mm.
   Thickness           0.8 mm.
Plug:
   Material             S.A.P. 7% alumina.
   External diameter    28.4 mm.
   Groove width        10 mm.
   Groove height       3.5 mm.
   Groove diameter     12 mm.
   Groove bead         $r=3$ mm.
Apparatus:
   Model               Magneform Mark 1.
   Maximum capacity    6 kj.
   Inner bore of insert   38 mm.
   End width of shoulder   5 mm.

| Operations No. | Capacity percent of maximum capacity | Depth of groove, mm. | Annular member, Aluminum (distance a=0.4 mm.) ||| Elastic ring |
| --- | --- | --- | --- | --- | --- | --- |
|  |  |  | Width, mm. | External diameter, mm. | Thickness, mm. | Rubber hardness Shore 60 diameter, mm. |
| 1 | 80  | 1.6 | 5 | 37.2 | 0.6 | 3 |
| 2 | 90  | 2.6 | 5 | 37.2 | 0.6 | 4.6 |
| 3 | 100 | 3.6 | 7 | 37.2 | 0.6 | 5.6 |
| 4 | 100 | 4.6 | 7 | 37.2 | 0.6 | 6.6 |

It is to be noted that in the second example, the elastic deformation obtained for a material having little plasticity such as the S.A.P. with an apparatus of limited capacity has been in the order of 4.6 mm.

It should again be noted that, because of the rubber ring, the compression stress or force is distributed evenly around the part to be deformed.

The hardness of the rubber of the compression rings is chosen in relation to the elastic properties of the material to be deformed.

The production of a series of grooves 9, adapted to form an expansion bellows for tube 10 constituting a S.A.P. sheath for a nuclear fuel element, is obtained according to the method above described by means of the dismountable die 11 illustrated in FIG. 3, in place of the plug 2.

The elastic rings 12, of rubber for instance, of a diameter corresponding to the depth $d$ of the desired grooves and in a number greater by 1 than the number of grooves, are stacked on a cylindrical core 13 and spaced from one another by metal rings 14.

The assembly formed by rings 12 and 14 is arranged between two sleeves 15 and 16 that serve to center the centering core 13 in tube 10, one bearing on the head 17 of core 13 and the other on a threaded washer 18 screwed on a threaded pin 19 and fixed into position by a nut 20.

The grooves 9 are formed, successively by mounting a rubber ring and an annular member as the ring 7 and member 8 of FIGURES 1 and 2, onto the parts of the tube between two rings 12, or simultaneously by mounting rubber rings and annular members on all the parts of the tube between two rings 12, particularly if an insert 4 having several shoulders 5 is used.

The invention has been described by reference to specific embodiments; it is however obvious that it is not limited thereby and variations and modifications thereof are possible within the spirit of the invention.

Thus, making a groove of limited depth before applying a compressive stress with the rubber ring, although preferable, is not an essential condition for carrying out the method.

Also, the first deformation operation may be carried out with an annular member 8 wider than the shoulder 5.

The method is not limited to the forming of the grooves on bodies having a cylindrical symmetry but it may also be applied to bodies having a flat shape; however, the metallic body similar to ring 8 of the described embodiment must have an annular shape in order to provide a closed path for the induced currents. Similarly, the shape of the rubber ring is not necessarily circular, and so its cross-section; the latter may be of other forms adapted to the shape of grooves to be obtained.

We claim:

1. Dismountable die for use in forming grooves on a tube, comprising:
   (a) a stack of elastic rings of a cross-sectional diameter corresponding to the depth of grooves to be formed and in a number equal to the number of grooves plus one;
   (b) metallic spacing rings between said elastic rings forming therewith on assembly;
   (c) a cylindrical core around which said assembly is mounted;
   (d) two centering sleeves, one at each end of said assembly, and
   (e) locking members at each end of said core operative with said sleeves to hold said assembly on said core.

2. Method of forming deep grooves on deformable and, usually, electrically conducting tubular bodies by means of a magnetic pulse forming apparatus essentially comprising a coil to create a pulsed magnetic field, a metallic body having a very low specific resistance formed with at least a shoulder for the concentration of the magnetic pressure on the zone of the body to be deformed, the zone overlying a groove on a die or a body to which said body is to be joined, a conductive intermediate driver member on which repulsive forces are induced and an elastic, pressure transmitting element between said intermediate member and the body to be deformed, the method comprising, performing in succession several forming operations with said intermediate driver member annular in shape and having a width at least as great as the width of said shoulder and a thickness which is small in relation to its width, said intermediate driver member disposed at a small distance from said shoulder and supported by an annular, elastic, pressure transmitting element of a succession of said elements, having a same shape, of which at least that of the final element of the succession corresponds to the shape of the groove to be obtained and being of progressively increasing sizes as the depth of the groove increases during its formation at each deforming operation, whereby the position of said intermediate member is maintained substantially constant and the elastics elements enter at each forming operation into the groove during its formation.

3. A method as claimed in claim, 2 wherein the preliminary steps of deforming said body is effected by concentration of the magnetic pressure in the said zone facing said shoulder, to form a groove of limited depth on said body facing the groove in the die or body and mounting the first of the succession of the elastic, pressure transmitting elements in direct contact with said groove of limited depth.

4. A method as claimed in claim 2, wherein a new elastic element of greater cross-section is used in succeeding series of identical forming operations.

5. A method as claimed in claim 2, wherein for each succeeding forming operation, a new annular member of greater width is used.

6. A method as claimed in claim 4, wherein for each succeeding series of forming operations, a new annular member of greater width is used.

7. A method as claimed in claim 5, wherein the annular members are of the same thickness and their width increases, from that of the shoulder to that of the groove to be formed.

8. A method as claimed in claim 6, wherein the annular members are of the same thickness and their width increases from that of the shoulder to that of the groove to be formed.

9. Device for forming deep grooves on deformable and, usually, electrically conducting tubular bodies by means of a magnetic pulse forming apparatus essentially comprising a coil to create a pulsed magnetic field and a metallic body having a very low specific resistance formed with at least one shoulder for the concentration of the magnetic pressure on the zone of the body to be deformed, said device comprising a series of annular conductive interchangeable intermediate driver members having a thickness not greater than 1 mm., each being of a different width ranging from the width of the shoulder and that of the groove to be obtained and a series of elastic elements having the shape of the groove to be formed, said elastic elements being of increased cross-section from one element to the other, whereby by means of the apparatus a succession of several forming operations or series of operations may be performed using at least a greater element at each succeeding operation or series of operations which maintains substantially constant the position of the intermediate member and enters into the groove during its formation.

References Cited

UNITED STATES PATENTS 3,171,014 2/1965 Ducati _____ 72—56 X
3,279,228 10/1966 Brower _____ 72—56

CHARLES W. LANHAM, *Primary Examiner*.